(12) United States Patent
Shin et al.

(10) Patent No.: US 9,893,754 B2
(45) Date of Patent: Feb. 13, 2018

(54) ELECTRONIC DEVICE CASES AND ELECTRONIC DEVICE HAVING THE SAME

(71) Applicant: Samsung Electronics Co., Ltd., Gyeonggi-do (KR)

(72) Inventors: Kwang Ha Shin, Gyeonggi-do (KR); Yun Jae Han, Seoul (KR); Seung Hoon Lee, Seoul (KR); Byoung Uk Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 17 days.

(21) Appl. No.: 14/835,275

(22) Filed: Aug. 25, 2015

(65) Prior Publication Data

US 2016/0056852 A1    Feb. 25, 2016

(30) Foreign Application Priority Data

Aug. 25, 2014 (KR) .................. 10-2014-0111108

(51) Int. Cl.
| | |
|---|---|
| *H04B 1/38* | (2015.01) |
| *H04B 1/3888* | (2015.01) |
| *H04B 1/3816* | (2015.01) |
| *H04M 1/02* | (2006.01) |
| *G06K 13/08* | (2006.01) |

(52) U.S. Cl.
CPC ......... *H04B 1/3888* (2013.01); *H04B 1/3816* (2013.01); *H04M 1/026* (2013.01); *G06K 13/08* (2013.01); *H04B 2001/3894* (2013.01); *H04M 2250/14* (2013.01)

(58) Field of Classification Search
CPC ............. H04B 1/3818; H04B 1/3888; H04B 2001/3894; H04B 1/3816; H04M 1/026; H04M 1/0254
See application file for complete search history.

(56) References Cited

U.S. PATENT DOCUMENTS

| | | | |
|---|---|---|---|
| 6,179,649 B1 * | 1/2001 | An ...................... | H04B 1/3816 379/433.09 |
| 7,093,764 B1 | 8/2006 | Valenzuela et al. | |
| 7,823,790 B1 | 11/2010 | Valenzuela et al. | |
| 8,215,558 B2 | 7/2012 | Valenzuela et al. | |
| 8,746,573 B2 | 6/2014 | Zhu et al. | |

(Continued)

FOREIGN PATENT DOCUMENTS

| | | |
|---|---|---|
| CN | 1423467 | 6/2003 |
| CN | 102016874 | 4/2011 |

(Continued)

OTHER PUBLICATIONS

European Search Report dated Jan. 22, 2016 issued in counterpart application No. 15182190.7-1972, 10 pages.

(Continued)

*Primary Examiner* — Hirdepal Singh
(74) *Attorney, Agent, or Firm* — The Farrell Law Firm, P.C.

(57) ABSTRACT

An electronic device case is provided. The electronic device includes a first case having a first groove and a second case. The second case includes a first body, a connection portion formed at the first body so as to be coupled with the first case when the first body is inserted into the first groove, and a card holding portion where a partition is formed to attach a card to the first body.

19 Claims, 21 Drawing Sheets

(56) References Cited

U.S. PATENT DOCUMENTS

| | | |
|---|---|---|
| 2006/0270455 A1 | 11/2006 | Zuo et al. |
| 2010/0267419 A1* | 10/2010 | Nishizawa ............ G06K 7/0021 455/558 |
| 2011/0174883 A1* | 7/2011 | Zhu ....................... H04M 1/026 235/486 |
| 2011/0267772 A1 | 11/2011 | Valenzuela et al. |
| 2011/0319132 A1* | 12/2011 | Hsu ..................... H04M 1/0254 455/558 |
| 2013/0085285 A1 | 4/2013 | Forstner et al. |
| 2014/0038533 A1* | 2/2014 | Zhuang ................ H04B 1/3816 455/90.2 |
| 2015/0018041 A1* | 1/2015 | Gorilovsky ........... G06F 1/1626 455/558 |
| 2015/0141077 A1* | 5/2015 | Sun ..................... H04B 1/3816 455/558 |
| 2015/0155651 A1* | 6/2015 | Ejiri ................... H01R 13/5213 439/521 |
| 2015/0155900 A1* | 6/2015 | Myers ................... G06K 13/08 455/558 |
| 2016/0072933 A1* | 3/2016 | Cox, III ................ H04M 1/185 455/575.8 |

FOREIGN PATENT DOCUMENTS

| | | | |
|---|---|---|---|
| CN | 102130979 | 7/2011 | |
| EP | 1 308 874 | 5/2003 | |
| EP | 1 583 252 | 10/2005 | |
| EP | 1583252 A1 * | 10/2005 | ........... H04B 1/3816 |
| WO | WO 2013/144291 | 10/2013 | |

OTHER PUBLICATIONS

Chinese Office Action dated Sep. 18, 2017 issued in counterpart application No. 201510526252.2, 16 pages.

* cited by examiner

ELECTRONIC DEVICE CASES AND ELECTRONIC DEVICE HAVING THE SAME

PRIORITY

This application claims priority under 35 U.S.C. §119(a) to a Korean Patent Application filed on Aug. 25, 2014, in the Korean Intellectual Property Office and assigned Serial number 10-2014-0111108, the entire disclosure of which is incorporated herein by reference.

BACKGROUND

1. Field of the Invention

The present disclosure relates generally to an electronic device case and an electronic device having the case.

2. Description of the Related Art

A card, such as a Subscriber Identification Module (SIM) card for storing personal additional service information, for example, subscriber information, network information, authentication information, a text message, an e-mail, etc. may be inserted into an electronic device, such as a mobile phone.

For example, a conventional electronic device may read information stored on a card by mounting the card on a main body of the electronic device such that the card is inserted into a card socket provided in a case of the mobile phone in a manner which permits the card to make contact with a circuit board installed on the main body of the electronic device.

However, in the conventional electronic device having a card mounted on a main body of the electronic device, it may be inconvenient to replace the card due to the necessity of performing the following steps: opening a cover of the electronic device, detaching the mounted card from the card socket, and inserting a new card into the card socket.

Furthermore, the conventional electronic device may need a separate card socket for mounting a card on a main body of the electronic device.

SUMMARY

The present disclosure has been made to address at least the above-mentioned problems and/or disadvantages and to provide at least the advantages described below.

Accordingly, an aspect of the present disclosure is to provide an electronic device case and an electronic device having the same, capable of attaching and detaching a portion of a case and mounting a card on a detachable case.

Accordingly, another aspect of the present disclosure is to provide an electronic device case and an electronic device having the same, capable of mounting a card on one side of a detachable case, thereby not needing a separate card socket.

Accordingly, another aspect of the present disclosure is to enable replacement of a card easily by putting the card on a card holding portion of a second case detachable from a first case.

Accordingly, another aspect of the present disclosure is to enable mounting a card on an electronic device case without a separate card socket.

Accordingly, another aspect of the present disclosure is to allow a bottom surface of a mounted card to easily make contact with a circuit board when a second case in which a card is inserted is coupled with a first case without pressing the card to the circuit board through a separate component.

In accordance with an aspect of the present disclosure, an electronic device case is provided. The electronic device includes a first case having a first groove and a second case. The second case includes a first body, a connection portion formed at the first body so as to be coupled with the first case when the first body is inserted into the first groove, and a card holding portion where a partition is formed to attach a card to the first body.

In accordance with another aspect of the present disclosure, an electronic device is provided. The electronic device includes a card for storing information, a second case including a card holding portion where a partition, formed of a material softer than a material of a body, is formed to attach the card, and a first case where a groove is formed such that a circuit board contacting with the card is exposed externally at coupling with the second case.

BRIEF DESCRIPTION OF THE DRAWINGS

The above and other aspects, features, and advantages of the present disclosure will be more apparent from the following description taken in conjunction with the accompanying drawings, in which.

DETAILED DESCRIPTION OF EMBODIMENTS

Figure 1:
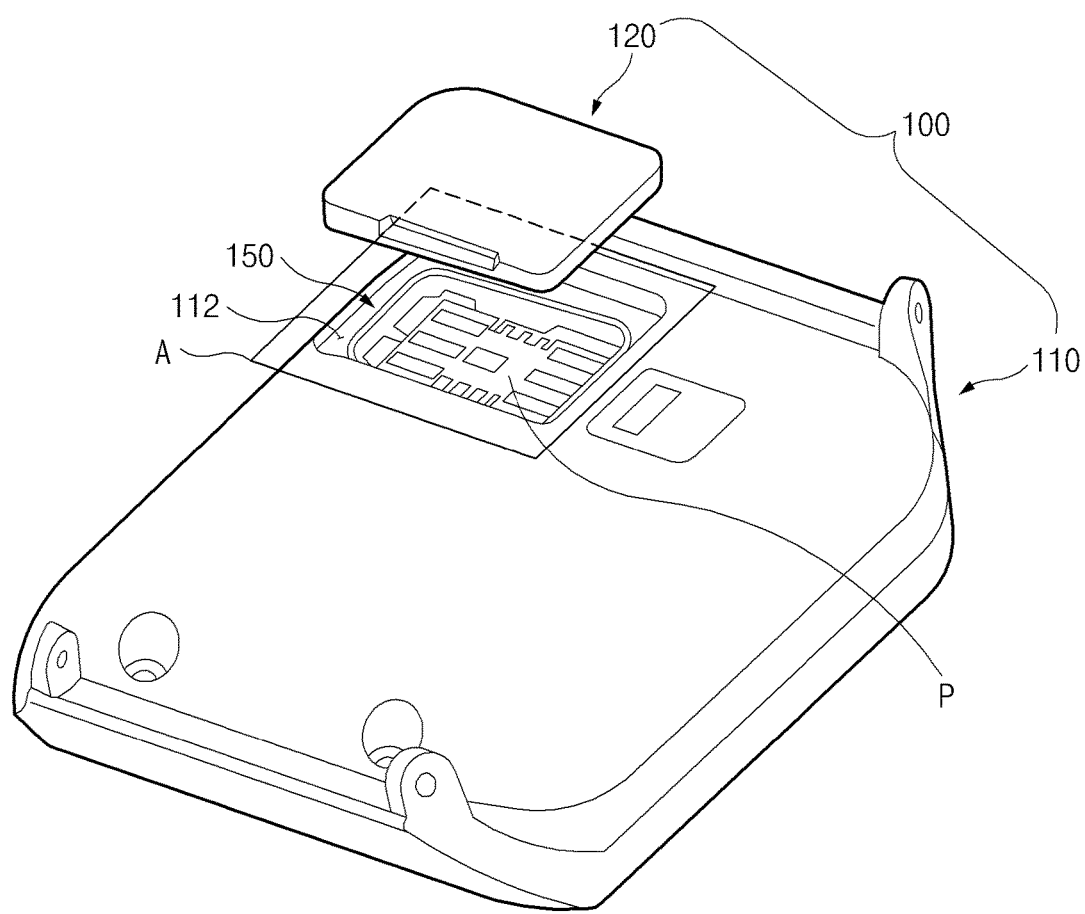
FIG. 1 is a perspective view of an electronic device in which a first case and a second case are detached, according to an embodiment of the present disclosure.

Various embodiments of the present disclosure may be described with reference to the accompanying drawings.

Accordingly, those of ordinary skill in the art will recognize that various modifications on the embodiments described herein can be made without departing from the scope and spirit of the present disclosure. With regard to description of the drawings, similar components may be marked by similar reference numerals.

In the present disclosure herein, the expressions "have", "may have", "include" and "comprise", "may include", and "may comprise" indicate the existence of corresponding features (e.g., elements such as numeric values, functions, operations, or components) but do not exclude the presence of additional features.

In the present disclosure herein, the expressions "A or B", "at least one of A or/and B", and "one or more of A or/and B", and the like may include any and all combinations of one or more of the associated listed items. For example, the terms "A or B", "at least one of A and B", and "at least one of A or B" may refer to the case (1) where A is included, the case (2) where B is included, or the case (3) where both A and B are included.

Terms, such as "first", "second", etc. used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expressions "suitable for", "having the capacity to", "designed to", "adapted to", "made to", or "capable of". The term "configured to" is not intended to mean only "specifically designed to" in hardware. Instead, an expression such as "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form include plural forms unless otherwise specified. Unless otherwise defined herein, all the terms used herein, which include technical or scientific terms, have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein. In some cases, even if terms are defined in the specification, they should not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, Personal Digital Assistants (PDAs), Portable Multimedia Players (PMPs), Motion Picture Experts Group (MPEG-1 or MPEG-2) Audio Layer 3 (MP3) players, mobile medical devices, cameras, wearable devices (e.g., Head-Mounted Devices (HMDs), such as electronic glasses), electronic apparel, electronic bracelets, electronic necklaces, electronic appcessories, electronic tattoos, smart watches, etc.

According to various embodiments of the present disclosure, the electronic devices may be smart home appliances. The smart home appliances may include at least one of, for example, televisions (TVs), Digital Versatile Disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, etc.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like), scanners (e.g. a Magnetic Resonance Angiography (MRA), a Magnetic Resonance Imaging (MRI), a Computed Tomography (CT) scanners, and ultrasonic devices) receiving a user input in an idle mode, navigation devices, Global Positioning System (GPS) receivers, Event Data Recorders (EDRs), Flight Data Recorders (FDRs), vehicle infotainment devices, electronic equipment for vessels (e.g., navigation systems and gyrocompasses), avionics, security devices, head units for vehicles, industrial or home robots, Automatic Teller Machines (ATMs), Point of Sales (POS) devices, or Internet of Things devices (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, etc.). The electronic devices may be one or more combinations of the above-mentioned devices. According to various embodiments of the present disclosure, an electronic device may be a flexible electronic device. Also, the electronic devices are not limited to the above-mentioned devices, and may include electronic devices according to the development of new technology.

Hereinafter, electronic devices according to various embodiments of the present disclosure will be described with reference to the accompanying drawings. The term "user" used herein may refer to a person who uses an electronic device or may refer to a device (e.g., an artificial intelligence electronic device) that uses an electronic device.

FIG. 1 is a perspective view of an electronic device in which a first case and a second case are detached, according to an embodiment of the present disclosure.

Referring to FIG. 1, an electronic device case 100 includes a first case 110 and a second case 120. The first case 110 having a first groove 112 opened, and the second case 120 including a first body 121 (shown in FIG. 2), a connection portion 130 (shown in FIG. 13) formed at the first body 121 so as to be coupled with the first case 110 when the first body is inserted into the first groove 112, and a card holding portion 140 where a partition 143 (shown in FIG. 2) is formed to attach a card to the first body 121 and is formed of a material softer than the first body 121.

The first case 110 may be a portion of a case and forms an electronic device case 100 in combination with the second case 120. In the first case 110, the first groove 112 may be formed at a position where a circuit substrate P is exposed to the outside. The first groove 112 may be located at a specified point of the first case 110 which allows a card inserted in the card holding portion 140 of the second case 120 to contact a circuit board exposed by the first groove 112 when the second case 120 is coupled with the first case 110.

The second case 120 includes a first body 121 having a shape corresponding to that of the first groove 112, to cover the first groove 112 by connecting the first case 110 and the second case 120 at a position where the first groove 112 is formed.

The first body 121 is lower in height than the first case 110 when the second case 120 is coupled with the first case 110, thereby preventing the second case 120 from protruding from the first case 110. For example, when the second case 120 is coupled with the first case 110, a height of the second case 120 may be 0.1 mm lower than that of the first case 110.

The second case 120 includes the connection portion 130 formed at the first body 121 to allow the first body 121 to be connected with the second case 120 when the first body 121 is inserted into the first groove 112.

The second case 120 includes the card holding portion 140 having the partition 143 formed of a material softer than the first body 121, to mount, on the first body 121, a card C, such that the card C contacts the circuit substrate P when the second case 120 is coupled with the first case 110.

Figure 2:
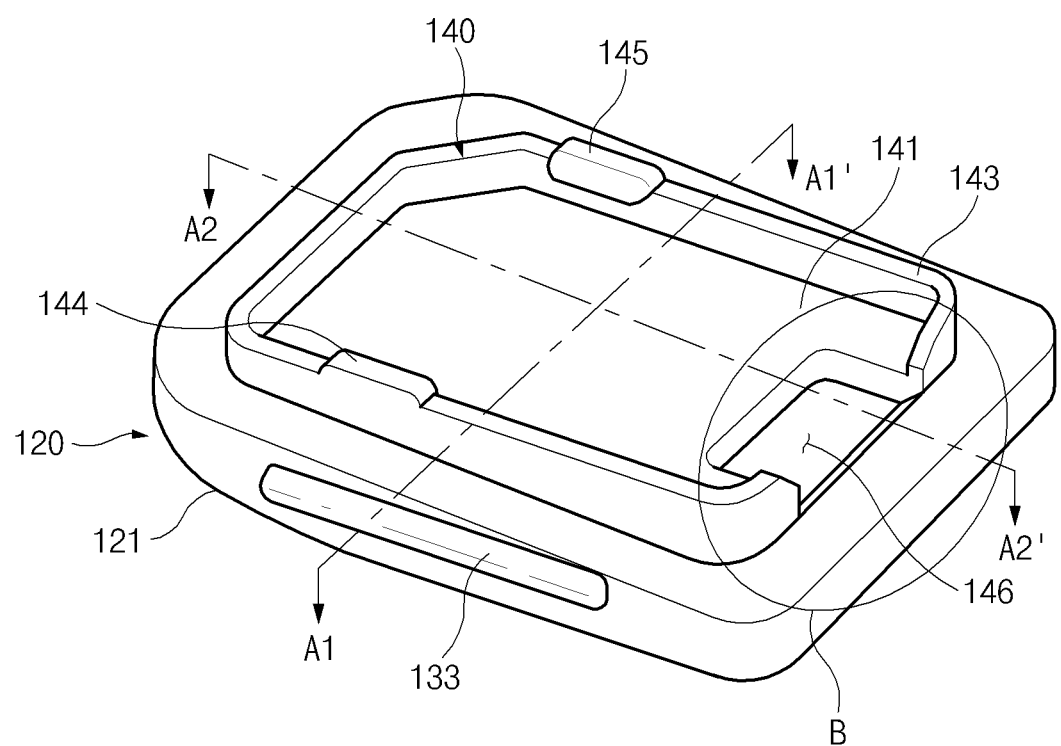
FIG. 2 is a rear perspective view of a second case including a card holding portion, according to an embodiment of the present disclosure.

FIG. 2 is a rear perspective view of a second case including a card holding portion, according to an embodiment of the present disclosure.

Referring to FIG. 2, the second cover 120 includes a first body 121 and a card holding portion 140. The card holding portion 140 may include a second body 141, as shown in FIG. 2. The second body 141 is disposed on a bottom surface of the first body 121, and a card may be placed on the second body 141. A partition 143 protrudes from a bottom surface of the second body 141, and includes a first hook (or a first wing) 144 and a second hook (or a second wing) 145, protruding inward from a top end portion of the partition 143 to prevent the card from being separated when placed on the second body 141. The second body 141, the partition 143, the first hook 144, and the second hook 155 may be implemented with one body. That is, the card holding portion 140 may be provided such that a configuration contacting with a card is formed of one body.

Accordingly, the second body 141 corresponds to a holding surface of the second case 120 upon which an inserted card is placed. The card holding portion 140 thus manufactured may be attached to a bottom surface of the second case 120.

In another embodiment of the second cover 120, the partition 143 protrudes directly from a bottom surface of the first body 121 of the second cover 120. In this case, an inserted card contacts the first body 121, instead of the second body 141, as shown in FIG. 2.

A section of the partition 143 may be provided in a shape of a card to be inserted into the card holding portion 140.

The card may correspond to a SIM card, and the SIM card may have, for example, a quadrangular shape. In this case, a section of the partition 143 is provided in a quadrangular shape to allow a quadrangular card to be placed in the partition 143, but is not limited thereto. For example, the partition 143 may be shaped to allow for cards having various other shapes to be used.

Furthermore, in the case where an inserted card is circular, a section of the partition 143 may be provided in a polygonal shape including a quadrangular shape, and various embodiments may be used according to a card shape.

The partition 143 may receive a card inserted therein and may have a waterproof function, that is, may prevent water from being infiltrated into the card inserted therein.

Figure 3:
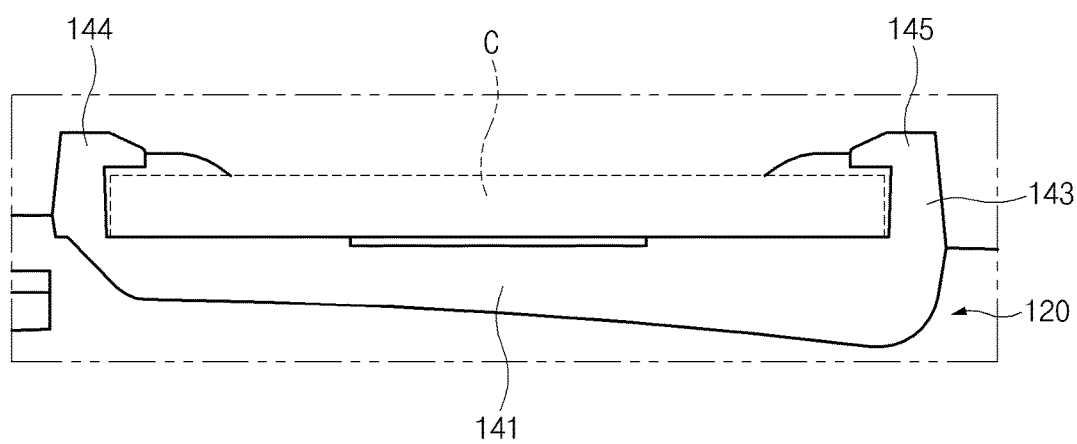
FIG. 3 is a cross-sectional view of a second case, according to an embodiment of the present disclosure.

FIG. 3 is a cross-sectional view of a second case, according to an embodiment of the present disclosure.

Referring to FIG. 3, a cross-sectional view of a second case 120 taken along the line A1-A1' shown in FIG. 2 is provided. To prevent an inserted card C from being separated from the partition 143, the second body 141 of the card holding portion 140 includes the first hook 144 protruding inward from the partition 143 and the second hook 145 protruding inward from the partition 143 and spaced apart from the first hook 144.

In the case where a section of the partition 143 is quadrangular, the first hook 144 may be formed so as to protrude inward toward a first sidewall of an inserted card C, and the second hook 145 may be provided so as to protrude inward toward a second sidewall opposite the first sidewall at which the first hook 144 is formed.

According to an embodiment of the present disclosure, in the card holding portion 140, one or more hooks which protrude inward from the partition 143 may be formed according to a section shape of the partition 143 at various positions where separation of an inserted card C is prevented by the one or more hooks.

Figure 4:
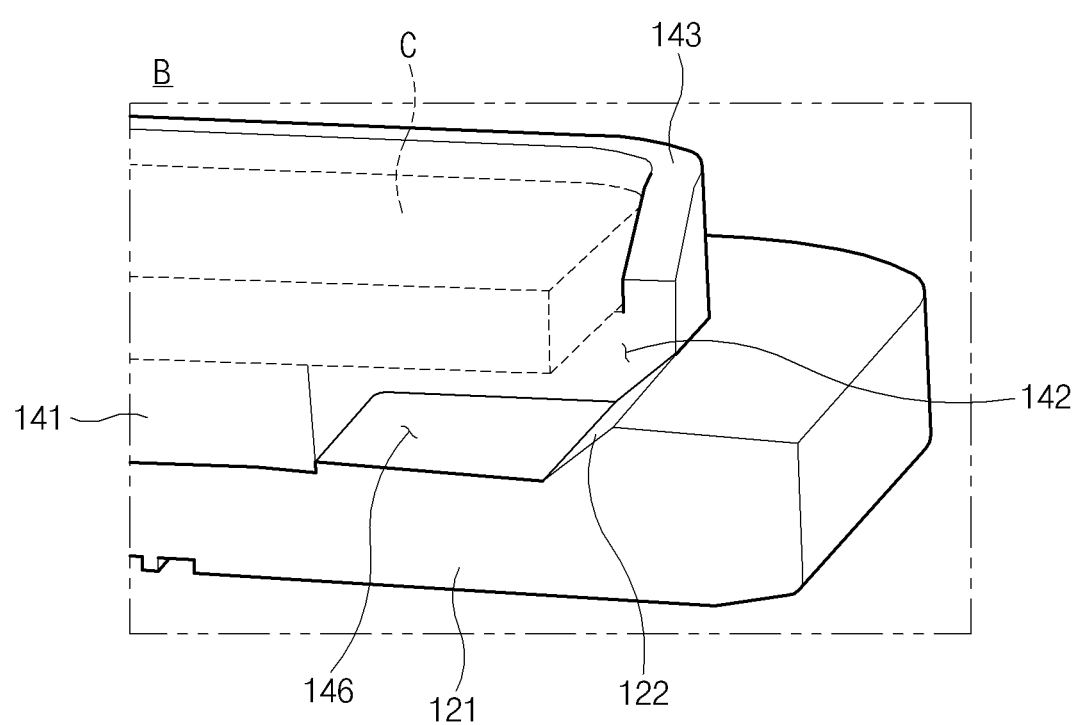
FIG. 4 is an expanded cross-sectional view of a portion of second case, according to an embodiment of the present disclosure.

FIG. 4 is an expanded cross-sectional view of a portion of second case, according to an embodiment of the present disclosure.

Referring to FIG. 4, an expanded cross-sectional view of a portion B of a second case 120 taken along A2-A2' shown in FIG. 2 is provided. A height of one side of the partition 143 formed at the second body 141 of the card holding portion 140 may be set to be low, thereby making it possible to form a groove at a part of the partition 143.

For example, in the case where a section of the partition 143 is quadrangular, a portion or an entirety of one of four sidewalls constituting the partition 143 may be formed to be lower in height than the remaining three sidewalls. Accordingly, a first insertion groove 146 may be formed at the surface of which the portion or the entire sidewall is lower in height than the remaining three sidewalls.

According to various embodiments of the present disclosure, the surface at which the first insertion groove 146 is formed may be a surface of the first body 121, as shown in FIG. 2. Alternatively, the surface at which the first insertion groove is formed may be a surface of the partition 143 protruding from the second body 141 and lower in height than the remainder of the surface of the partition 143. As the first insertion groove 146 is formed, a space of which one side is opened may be formed between the first body 121 or the second body 141 to allow one end portion of a card C to be inserted into the partition 143. A user may insert his/her nail into the first insertion groove 146 to detach the inserted card C easily from the card holding portion 140.

The card holding portion 140 includes a second insertion groove 142, which is formed at one side of the second body 141 adjacent to the first insertion groove 146 and is recessed inward, to allow the user to easily detach the inserted card C by inserting his/her nail into the first insertion groove 146.

In the case where the first insertion groove 142 is formed at the second body 141, if the user inserts his/her nail into the first groove 146, the end of his/her nail may be deeply inserted under the bottom surface of an inserted card C, thereby making it possible for the user to detach the card C from the card holding portion 140 more easily.

The first case 110 according further includes an incline 122 sloping downward from a top end of the first insertion groove 146, thereby making it possible for the user to detach an inserted card C more easily by inserting his/her nail into the above-described first and second insertion grooves 146 and 142.

Accordingly, when the user inserts his/her nail under a bottom end portion of the card C through the first insertion groove 146, the end of his/her nail may slide along the incline 122, thereby making it possible for the end of his/her nail to be inserted under the bottom end portion of the card C more easily.

The card holding portion 140 may be formed of a material softer than the first case 110. The card holding portion 140 may be formed of a material having an elastic property, such as rubber, urethane, etc.

In this specification, the term "soft" means that when a material such as rubber or urethane suffers an external force, an installed position and the like are transformed by the external force but returns to a previous state when the external force is removed. For example, a soft material may be a material having an elastic force such as rubber, urethane, etc. Furthermore, if having such a physical characteristic, various materials may be used.

The first case 110 may be formed of a material harder than the card holding portion 140, for example, a reinforced plastic material.

When card holding portion 140 is formed of a soft material, the partition 143 may be transformed when a card C is inserted into the card holding portion 140, thereby making it possible for the card C to be inserted into the partition 143 easily. After inserted, the card C may be pressed by both sidewalls of the partition 143 contacting with the card C, thereby preventing the card C from being separated from the card holding portion 140.

Hereinafter, the card holding portion 140 will be described under assumption that the card holding portion 140 has a quadrangular partition 143 and the partition 143 is formed of a soft material such as urethane.

FIGS. 5A to 5D are perspective views illustrating inserting and detaching a card from a card holding portion, according to an embodiment of the present disclosure.

Referring to 5A, a card C may be inserted in the partition 143 by placing the card C in the card holding portion 140 in a vertical direction parallel to the surface of the card holding portion 140. As the card C descends in the vertical direction, the card contacts the top surfaces of the first hook 144 and the second hook 145 and engages the first hook 144 and the second hook 145. The partition 143 which the first hook 144 and the second hook 145 are coupled with may be formed of a soft material, so transformation such as inclination toward one side may occur.

When the partition 143 slopes toward one side as a result of the transformation, the card C may be inserted into the partition 143. When the card C is placed under the first hook 144 and then under the second hook 145, the partition 143 (suffering transformation such as inclination) returns to an original position to press sidewalls of the inserted card C. Accordingly, card insertion may be completed.

The top surfaces of the first hook 144 and the second hook 145 may be inclined in an inner direction of the partition 143, as illustrated in FIG. 3, to allow a card C to be inserted easily. In the case where an incline is formed, the transformation such that the partition 143 is inclined toward one side may be more easily accomplished when the card C presses the first hook 144 and the second hook 145 and descends, thereby making it possible for the card C to be inserted more easily.

Figure 5A:
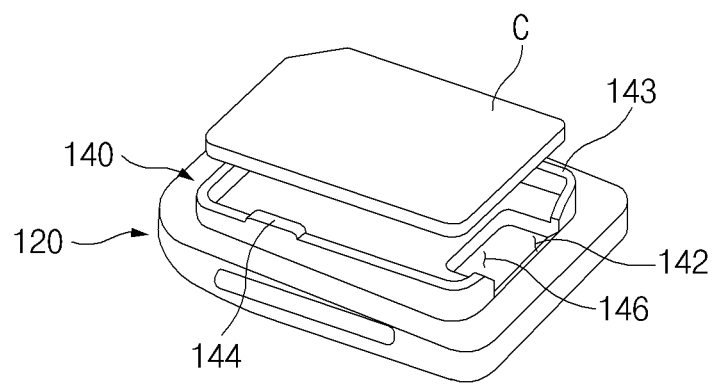
FIGS. 5A to 5D are perspective views illustrating inserting and detaching a card from a card holding portion, according to an embodiment of the present disclosure.
Figure 5B:
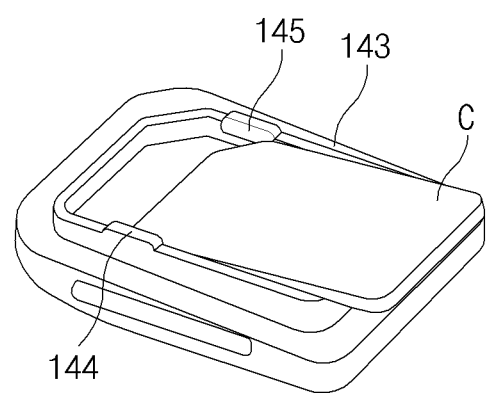
Figure 5C:
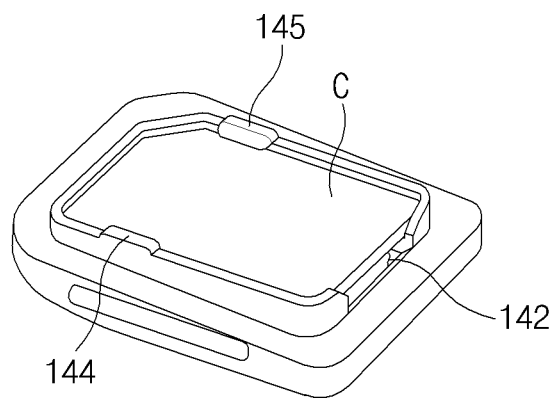

Referring to FIG. 5C, when card insertion is completed, the first hook 144 and the second hook 145 prevents the inserted card C from being separated is placed on the card holding portion 140, with its sidewalls pressed by the partition 143 surrounding the card C.

Referring to FIG. 5B, a card C may be inserted into the partition 143 by sliding the card C into the card holding portion 140. In this case, the front end of the card C is inserted under (or into bottom ends of) the first hook 144 and the second hook 145 from a sidewall of the card holding portion 140, and a bottom surface of the rear end of the card C contacts a top surface of the partition 143 as it slides into the card holding portion 140. In the case, a transformation such that the partition 143 is inclined toward one side may occur because the partition 143 is formed of a soft material. Accordingly, it may be possible to insert the card C more easily. Referring to FIG. 5C, as described above, when card insertion is completed, a state where the card C is put on the card holding portion 140 may be maintained.

Figure 5D:
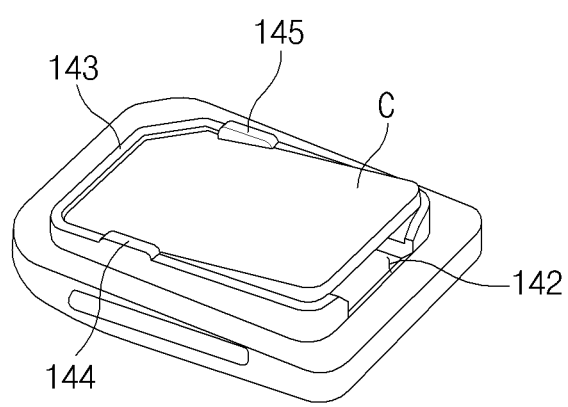

Referring to FIG. 5D, a user may insert his/her nail into the first insertion groove 146, with card C placed in the card holding portion 140. If a bottom surface of the card C is pressed by the end of the nail inserted through the first insertion groove 146, the partition 143 pressing the card C may be inclined toward one side, that is, transformation may occur, and the card C is disengaged from the first hook 114 and the second hook 145 restricting an upper surface of the card C. The card C may thus be detached outside the partition 143 through the above-described operations.

Figure 6:
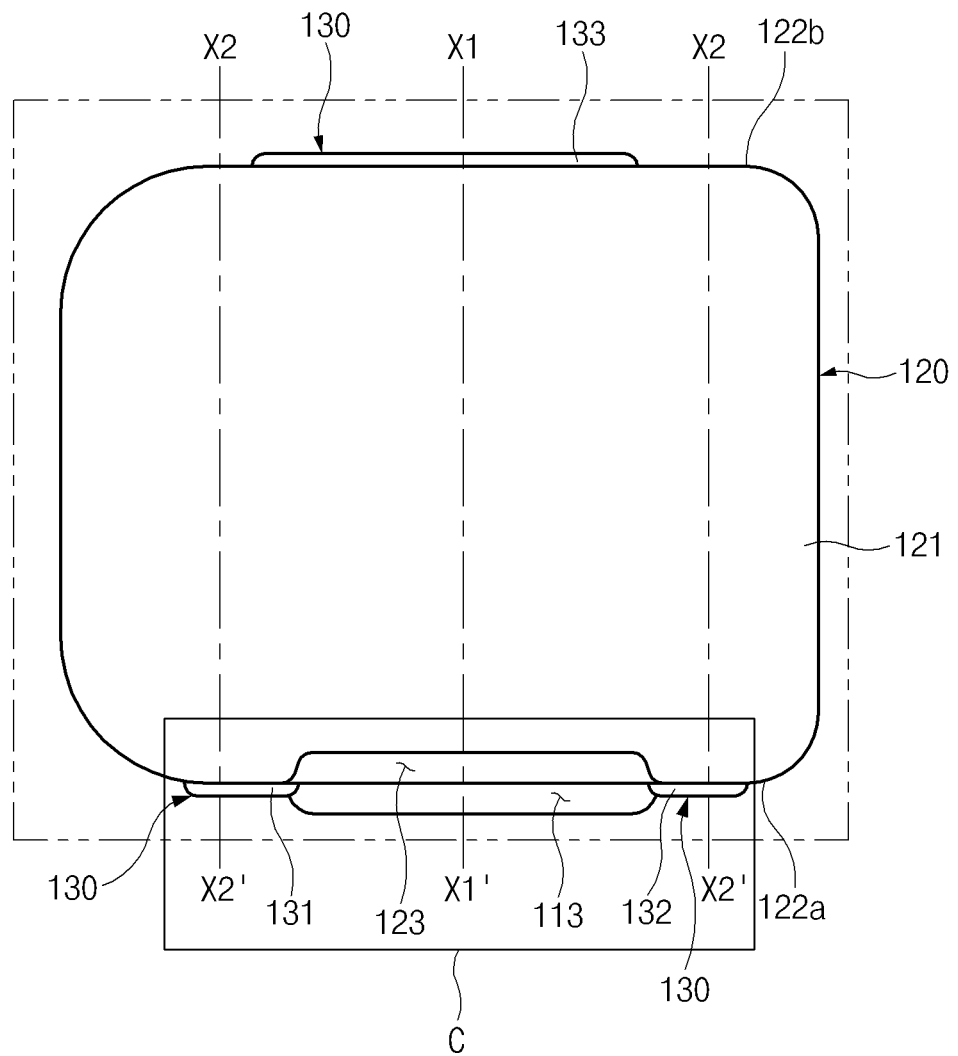
FIG. 6 is a planar view of a second case, according to an embodiment of the present disclosure.

FIG. 6 is a planar view of a second case, according to an embodiment of the present disclosure.

Referring to FIG. 6, the second case 120 includes a connection portion 130 The connection portion 130 includes a third hook 131 and a fourth hook 132 protruding from a first side of the first body 121 in the same direction, the fourth hook 132 being spaced apart from the third hook 131, and the connection portion further includes a fifth hook 133 protruding from a second side of the first body 121 in a direction opposite from the direction in which the first hook 144 protrudes.

In the case where the first body 121 of the second case 120 is quadrangular, the third hook 131 and the fourth hook 132 are spaced apart from each other on a first surface 122a being a same surface of the first body 121 and may protrude from the first body 121, and the fifth hook 133 may protrude from a second surface 122b, being a surface opposite the first surface 122a, in a direction opposite from a direction in which the third and fourth hooks 131 and 132 protrude.

The first case 110 includes a plurality of grooves into which the third to fifth hooks 131 to 133 are inserted when the second case 120 is coupled with the first case 110.

That is, the first case 110 may include a second groove 114 into which the third hook 131 is inserted, a third groove 115 into which the fourth hook 132 is inserted, and a fourth groove 116 into which the fifth hook 133 is inserted.

The second case 120 includes a third insertion groove 123 formed at the first body so as to be inwardly recessed between the third hook 131 and the fourth hook 132, thereby making it possible to easily detach the second case 120 coupled with the first case 110.

A user may detach the second case 120 from the first case by inserting his/her nail into the third insertion groove 123 and lifting up the second case 120.

For easier detachment, the first case 110 includes a fourth insertion groove 113 formed at a position corresponding to the third insertion groove 123. Since a gap is formed between the first case 110 and the second case 120 by the fourth insertion groove 113, the user may easily insert his/her nail into the third insertion groove 123.

Figure 8:
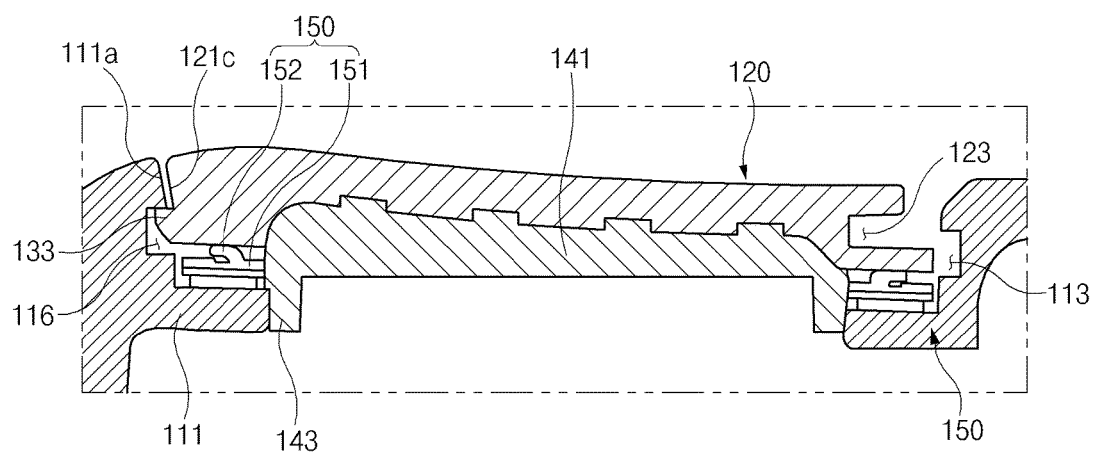
FIGS. 8 and 9 are cross sectional views of a first case coupled with a second case, according to an embodiment of the present disclosure.
Figure 9:
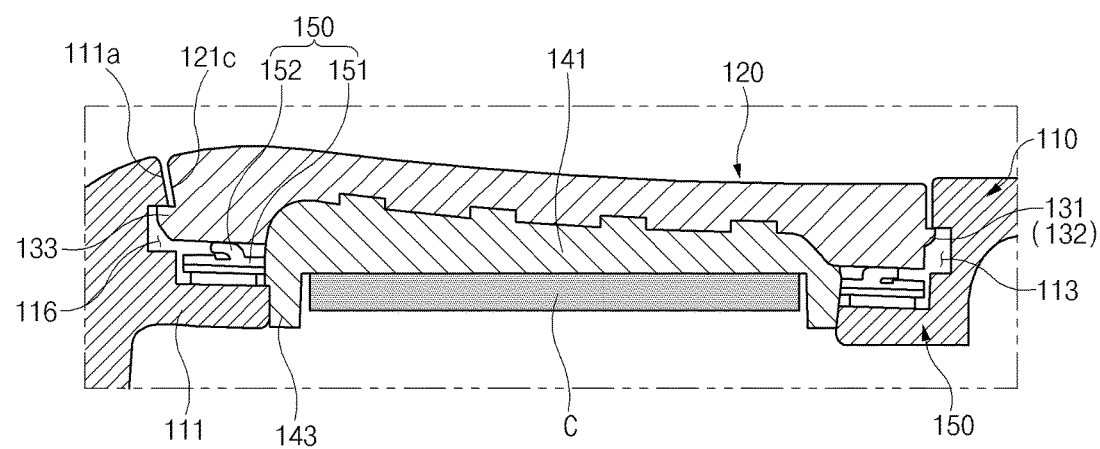

FIGS. 8 and 9 are cross sectional views of a first case coupled with a second case, according to an embodiment of the present disclosure.

Referring to FIG. 8, a cross sectional view of a first case 110 coupled with a second case 120, taken along a line X1-X1' line of the second case 120 shown in FIG. 6 is provided.

Referring to FIGS. 6 and 8, the second case 120 may be coupled with the first case 110 by inserting the fifth hook 133 into the fourth groove 116 and respectively inserting the third hook 131 and the fourth hook 132 into the second groove 114 and the third groove 115 after inclining the second case 120. Arrangement of the third to fifth hooks 131 to 133 may not be limited to an embodiment disclosed in figures. The third to fifth hooks 131 to 133 may be disposed at various positions of the second case 120.

Referring to FIG. 9, a cross sectional view of a first case 110 coupled with a second case 120, taken along a line X2-X2' line of the second case 120 shown in FIG. 6 is provided.

Referring to FIGS. 8 and 9, when the second case 120 is coupled with the first case 110, one sidewall of the partition 143 may be a portion of the first case 110 and may contact with a sidewall of the protrusion rear 111 forming a circumference surface at a bottom surface of the first groove 112. The partition 143 may be provided to contact with the protrusion rear 111, thereby making it possible to fasten the card holding 140 at the first groove 112 more heavily.

Accordingly, even when an external impact is applied to the electronic device case 100, the card holding portion 140 may effectively prevent a card from being separated due to the external impact, and it may be possible to minimize vibration, movement, and the like transferred to the card in using the electronic device case 100.

Figure 7:
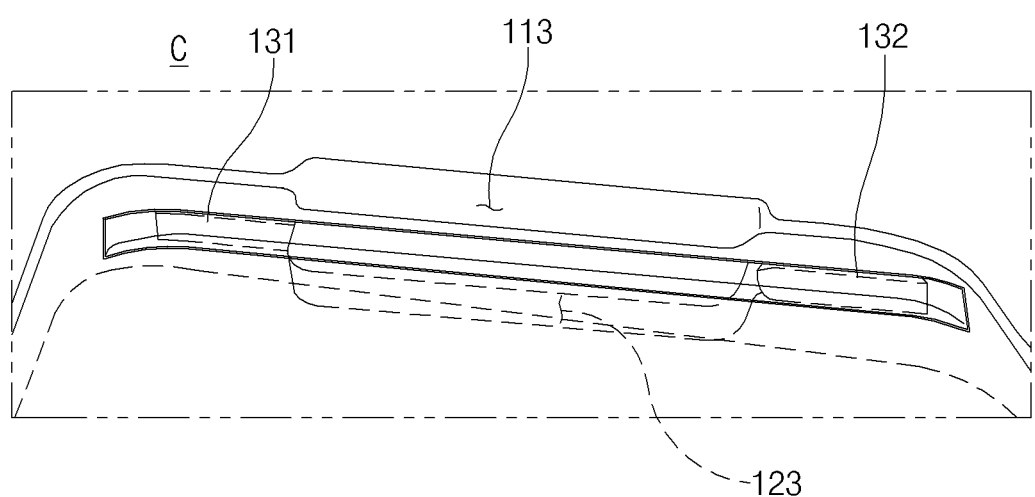
FIG. 7 is an expanded perspective view of a portion of a second case, according to an embodiment of the present disclosure.

FIG. 7 is an expanded perspective view of a portion of a second case, according to an embodiment of the present disclosure.

Referring to FIG. 7 an expanded perspective view of a portion C shown in FIG. 6 is provided. Referring to FIGS. 7 and 9, in the case of detaching the second case 120 from the first case 110, if a user inserts his/her nail into the third insertion groove 123 formed at the first body 121 and presses the second case 120 outward, the second case 120 may be detached from the first case 110.

For easier detachment, a surface 121c where the fifth hook 133 protrudes from the first body 121 and a surface 111a of the first case 110 opposite to the surface 121c may be formed to be inclined toward one side. For example, the above-described surfaces may be formed to have a gradient of about 10 degrees relative to a vertical axis.

Figure 10:
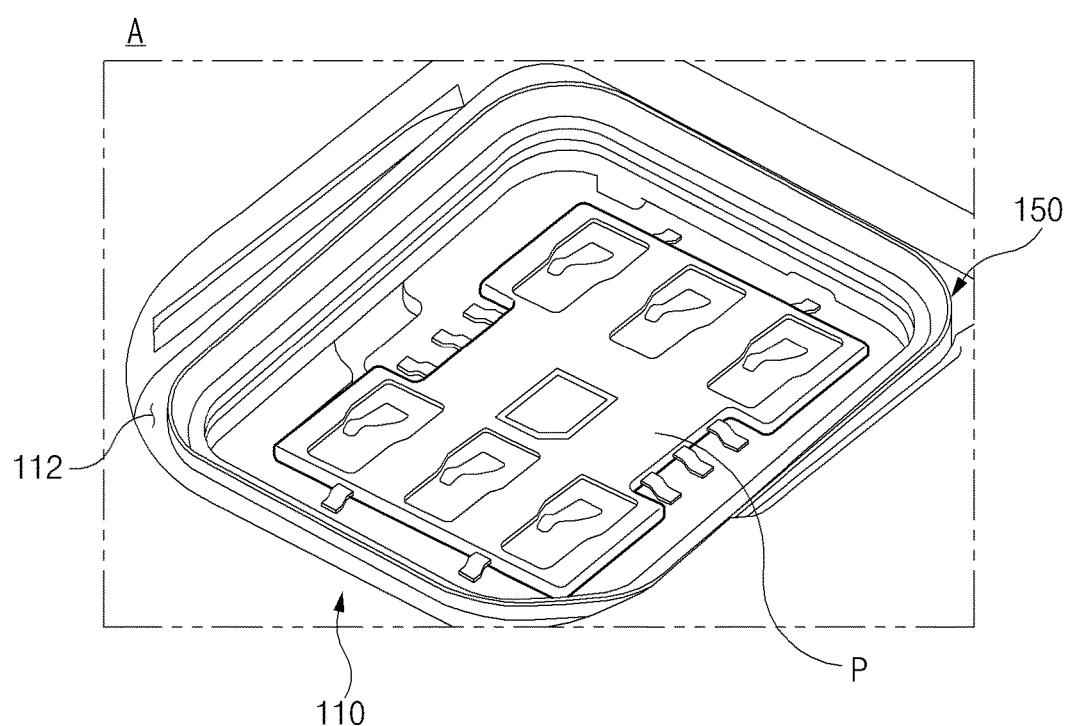
FIG. 10 is a perspective view of a portion of a first case, according to an embodiment of the present disclosure.

FIG. 10 is a perspective view of a portion of a first case, according to an embodiment of the present disclosure.

Referring to FIG. 10, a perspective view of a portion A of a first case 110 shown in FIG. 1 is provided. The first case 110 includes a waterproof portion 150 to prevent water from infiltrating into a card through a gap between the first case 110 and the second case 120. The waterproof portion 150 is a portion of the first case 110 and may be provided on an upper surface of a protrusion rear 111 forming a circumference surface at a bottom end of the first groove 112. As shown in FIGS. 8 and 9, the waterproof portion 150 includes a first waterproof member 151 attached on a top surface of the protrusion rear 111, and a second waterproof member 152 making an angle of inclination relative to the first waterproof member 151, protruding from a top surface of the first waterproof member 151, and formed of a material providing an elastic force so as to press the first body 121 when connecting the first case 110 and the second case 120. Accordingly, when the second case 120 is coupled with the first case 110, the second waterproof member 152 may press the second case 120 upward, and a top surface of the third hook 131 and a top surface of the fourth hook 132 may press an inner wall of the first case 110 at which the second groove 114 and the third groove 115 are formed, thereby further strengthening a coupling force between the first case 110 and the second case 110.

FIGS. 11 to 17 describe another embodiment of the second case 120.

Figure 11:
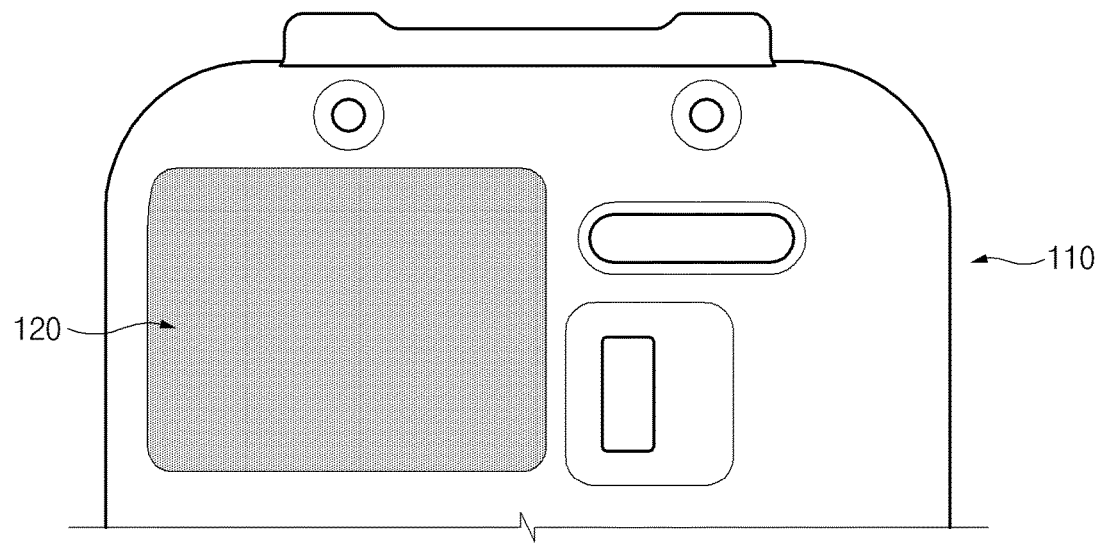
FIGS. 11 and 12 are front views of an electronic device case, according to an embodiment of the present disclosure.
Figure 12:
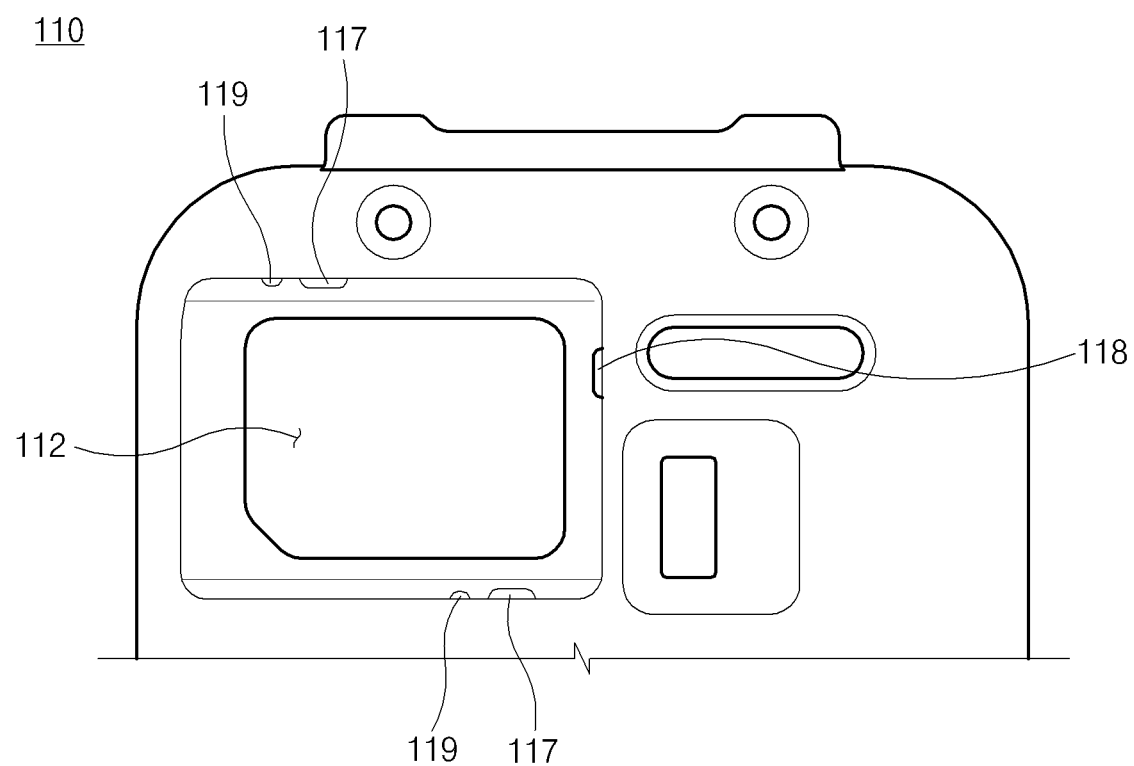

FIGS. 11 and 12 are front views of an electronic device case, according to an embodiment of the present disclosure.

Referring to FIG. 11, an electronic device case 100 includes a first case 110 and a second case 120 is provided.

Referring to FIG. 12, the first case 110 includes at least one sixth hook 117 and at least one seventh hook 118.

Figure 13:
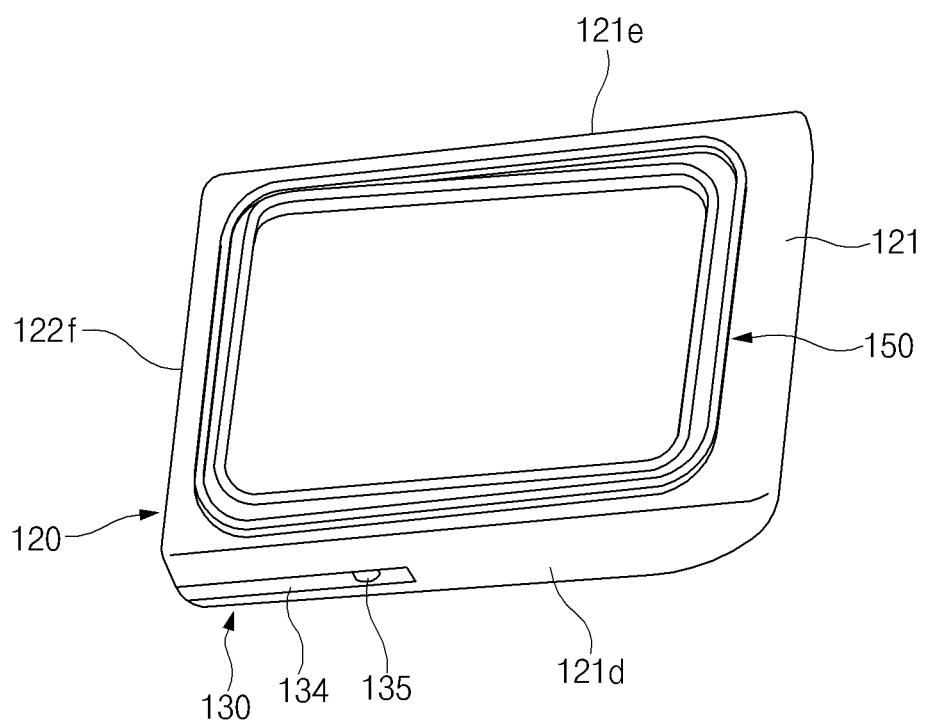
FIGS. 13 to 15 are views of a second case, according to an embodiment of the present disclosure.
Figure 14:
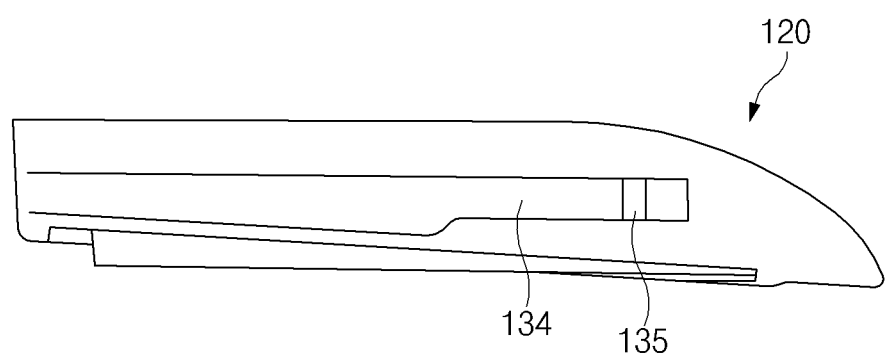
Figure 15:
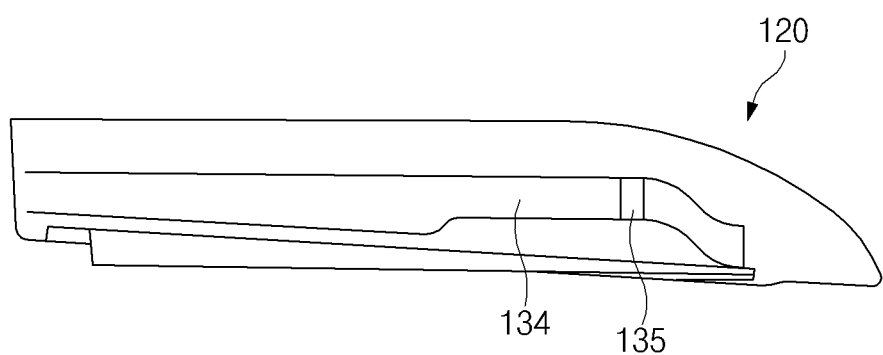

FIGS. 13 to 15 are views of a second case, according to an embodiment of the present disclosure.

Referring to FIG. 13, a rear perspective view of a second case 120 is provided. Referring to FIGS. 14 and 15, rear perspective views of a second case 120 are provided. In the second case 120, the connection portion 130 includes one or more rails 134 of a groove shape and a fifth groove 135 at the first body 121 to allow the second case 120 to be coupled with the first case 110 in a sliding manner.

The sixth hook 117 of the first case 110, as shown in FIG. 12, may be inserted into the rail 134 of the second case 120 so as to guide movement of the second body 141. The seventh hook 118 of the first case 110, as shown in FIG. 12, protrudes from one side of the first body 110 so as to be inserted into the fifth groove 135 of the second case 120 when the second case 120 is inserted in the first case 110.

The rails 134 of the second case 120 are respectively formed at a first sidewall 121d and a second sidewall 121e of the first body 121 so as to be inwardly recessed.

Figure 17:
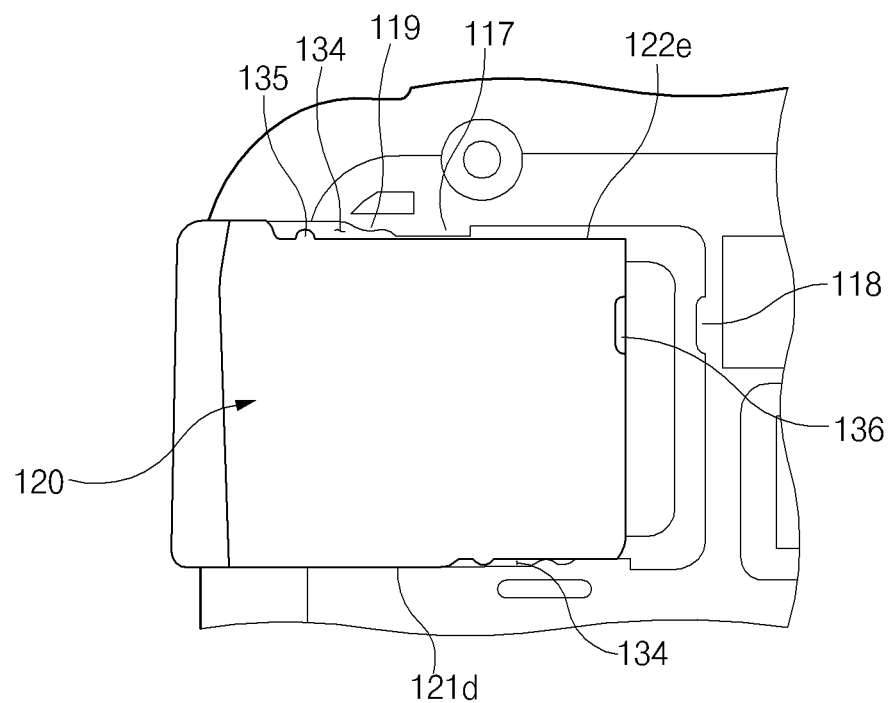

The rails 134 may, alternatively, be respectively formed at a first surface 122d and a second surface 122e of the first body 121, shown in FIG. 17. In this case, the sixth hooks 117 may protrude toward the rails 134 from surfaces of the first case 110 corresponding to the first and second surfaces 122d and 122e, so as to be inserted into the rail 134.

The sixth hooks 117 may be placed at different positions, as shown in FIG. 12, at a direction where the second case 120 slides toward the first case 110, that is, at the front and the rear.

The connection portion 130 of the second case 120 may further include an eighth hook 136 protruding toward one side from the rear portion of the rail 134 at a direction where the second case 120 slides into the first case 110. In this case, the first case 110 may further include a ninth hook 119 at the rear of the sixth hook 117.

As shown in FIG. 15, in the connection portion 130, the rear of the rail 134 may be lower than the front of the rail at a position where the second case 120 slides into the first case 110. In this case, when the second case 120 is inserted into the first case 110, as the sixth hook 117 is inserted into the rail 134 and the second case 120 slides into the first case 110, the second case 120 may be pressed in a direction of the first case 110, thereby allowing the second case 120 to be coupled with the first case 110.

The second case 120 may further include a waterproof portion 150 to prevent water from be infiltrated into a card put on the second case 120. A structure of the waterproof portion 150 according to various embodiments of the present disclosure may be substantially the same as that described with reference to the embodiment shown in FIG. 10.

Figure 16:
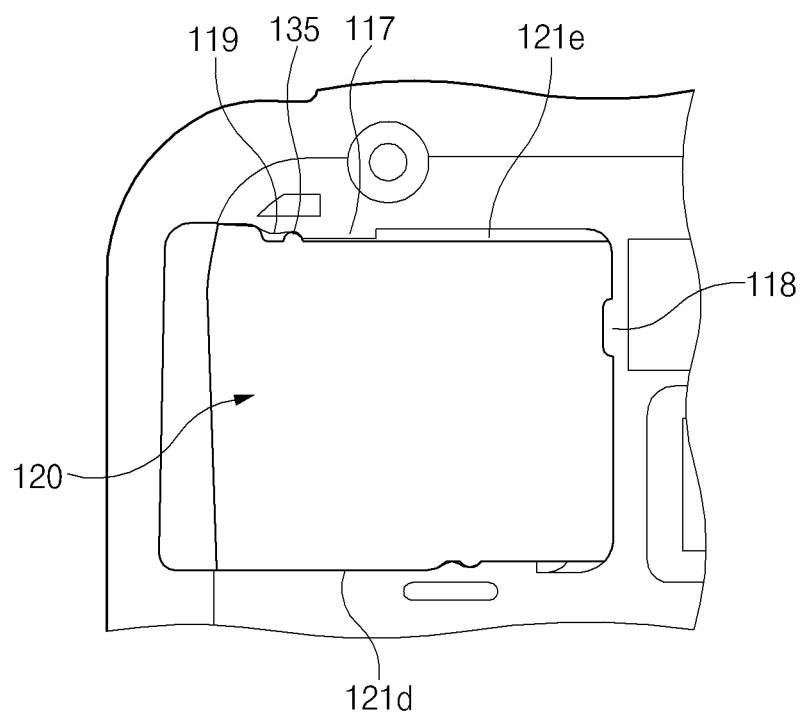
FIGS. 16 and 17 illustrate operating state views of a second case, according to an embodiment of the present disclosure.

FIGS. 16 and 17 illustrate operating state views of a second case, according to an embodiment of the present disclosure.

Referring to FIG. 16, an operation of coupling the second case 120 with the first case 110 is provided. When the second case 120 is inserted into the first groove 112 of the first case 110, the sixth hook 117 is inserted into the rail 134 formed at the first body 121. When the second case 120 moves toward one side of the first case 110, the rail 134 and the sixth hook 117 guides the movement of the second case 120. The movement of the second case 120 allows the seventh hook 118 to be inserted into the fifth groove 135 formed at the first case 110 and causes the coupling of the second case 120 and the first case 110 to be completed.

As another embodiment, in the case where the connection portion 130 further includes the eighth hook 136 and the first case 110 further includes the ninth hook 119, the ninth hook 119 is inserted between one end portion of the rail 134 and the eighth hook 136, when coupling of the second case 120 and the first case 110 is completed, thereby improving a coupling force between the second case 120 and the first case 110.

Referring to FIG. 17, an operation of detaching the second case 120 from the first case 110 is provided. The second case 120 may be detached from the first case 110 by sliding the second case 120 in a direction opposite from a direction where the second case 120 moves upon coupling.

Accordingly, an electronic device, according to various embodiments of the present disclosure, may include the electronic device case 100. The electronic device case 100 includes a second case 120 having the above-described card holding portion 140 to which a card C storing information is attached, and a first case 110 in which a first groove by which a circuit board contacting with the card C is exposed at coupling with the second case 120 is formed. The electronic device, according to various embodiments of the present disclosure, may include a mobile phone, a portable camera, and various wearable devices and may include the electronic device case 100, thereby making it possible to easily replace the card C.

Figure 18:
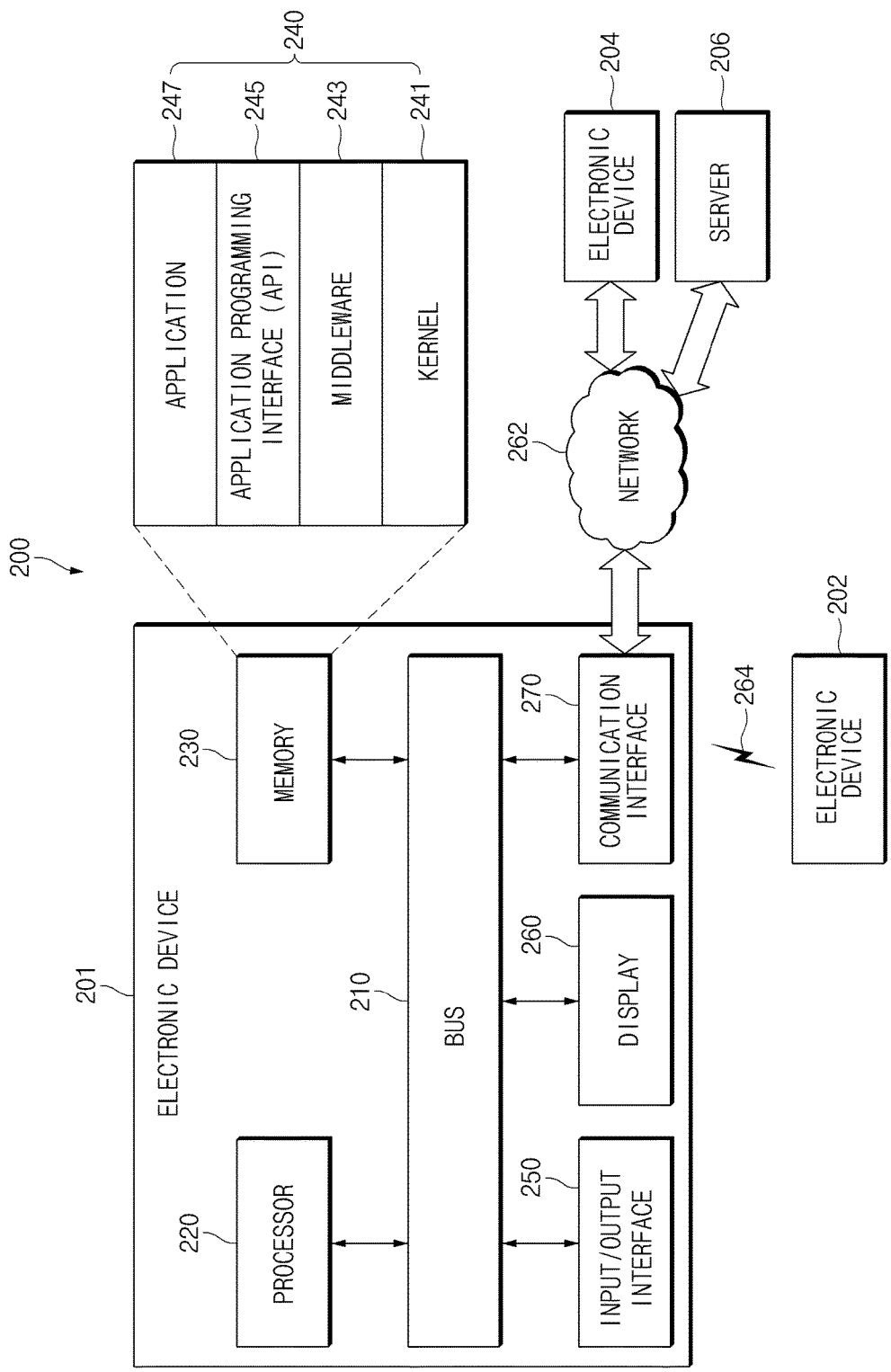
FIG. 18 is a diagram illustrating an electronic device in a network environment, according to an embodiment of the present disclosure.

FIG. 18 is a diagram illustrating an electronic device in a network environment, according to an embodiment of the present disclosure.

Referring to FIG. 18, there is illustrated an electronic device 201 in a network environment 200. The electronic device 201 includes a bus 210, a processor 220, a memory 230, an input/output interface 250, a display 260, and a communication interface 270. The electronic device 201 may not include at least one of the above-described components or may further include other component(s).

The bus 210 interconnects the above-described components 210 to 270 and is a circuit for conveying communications (e.g., a control message and/or data) among the above-described components.

The processor 220 includes one or more of a Central Processing Unit (CPU), an Application Processor (AP), or a Communication Processor (CP). The processor 220 may perform, for example, data processing or an operation associated with control or communication of at least one other component(s) of the electronic device 201.

The memory 230 may include a volatile and/or nonvolatile memory. The memory 230 stores instructions or data associated with at least one other component(s) of the electronic device 201. The memory 230 may store software and/or a program 240. The memory 230 may include, for example, a kernel 241, a middleware 243, an application programming interface (API) 245, and/or an application (or an application program) 247. At least a portion of the kernel 241, the middleware 243, or the API 245 may be called an "operating system (OS)".

The kernel 241 controls or manages system resources (e.g., the bus 210, the processor 220, the memory 230, and the like) that are used to execute operations or functions of other programs (e.g., the middleware 243, the API 245, and the application program 247). Furthermore, the kernel 241 may provide an interface that allows the middleware 243, the API 245, or the application program 247 to access discrete components of the electronic device 201 so as to control or manage system resources.

The middleware 243 performs a mediation role such that the API 245 or the application program 247 communicates with the kernel 241 to exchange data. Furthermore, with regard to task requests received from the application program 247, for example, the middle ware 243 may perform a control (e.g., scheduling or load balancing) on a task request using a method of assigning the priority, which makes it possible to use a system resource (e.g., the bus 210, the processor 220, the memory 230, or the like) of the electronic device 201, to at least one application.

The API 245 is an interface through which the application program 247 controls a function provided by the kernel 241 or the middleware 243, and may include, for example, at least one interface or function (e.g., an instruction) for a file control, a window control, image processing, a character control, or the like.

The I/O interface 250 transmits an instruction or data, input from a user or another external device, to other component(s) of the electronic device 201. Furthermore, the I/O interface 250 outputs an instruction or data, received from other component(s) of the electronic device 201, to a user or another external device.

The display 260 may include, for example, a Liquid Crystal Display (LCD), a Light-Emitting Diode (LED) display, an Organic LED (OLED) display, or a microelectromechanical systems (MEMS) display, or an electronic paper display. The display 260 may display, for example, various contents (e.g., a text, an image, a video, an icon, a symbol, and the like) to a user. The display 260 may include a touch screen and may receive, for example, a touch, gesture, proximity, or hovering input using an electronic pen or a portion of a user's body.

The communication interface 270 establishes communication between the electronic device 201 and an external electronic device (e.g., a first external electronic device 202, a second external electronic device 204, or a server 206). For example, the communication interface 270 may be connected to a network 262 through wireless communication or wired communication to communicate with the external device (e.g., a second external electronic device 204 or a server 206).

The wireless communication may include at least one of, for example, LTE, LTE-A, CDMA, WCDMA, UMTs, WiBro, GSM, or the like, as cellular communication protocol. The wired communication may include at least one of, for example, a Universal Serial Bus (USB), a High Definition Multimedia Interface (HDMI), a Recommended Standard-232 (RS-232), or a Plain Old Telephone Service (POTS). The network 262 may include at least one of telecommunications networks, for example, a computer network (e.g., LAN or WAN), the Internet, or a telephone network.

Each of the first and second external electronic devices 202 and 204 may be a device of which the type is different from or the same as that of the electronic device 201. The server 206 may include a group of one or more servers.

According to various embodiments of the present disclosure, all or a part of operations that the electronic device 201 will perform may be executed by another or a plurality of electronic devices (e.g., the electronic devices 202 and 204 and the server 206). According to an embodiment of the present disclosure, in the case where the electronic device 201 executes any function or service automatically or in response to a request, the electronic device 201 may not perform the function or the service internally, but, alternatively or additionally, it may request at least a portion of a function associated with the electronic device 201 at the electronic device 202 or 204 or the server 206. In this case, the electronic device 202 or 204 or the server 206 executes the requested function or additional function and transmits the execution result to the electronic device 201. The electronic device 201 may provide the requested function or service using the received result or may additionally process the received result to provide the requested function or service. To this end, for example, cloud computing, distributed computing, or client-server computing may be used.

Figure 19:
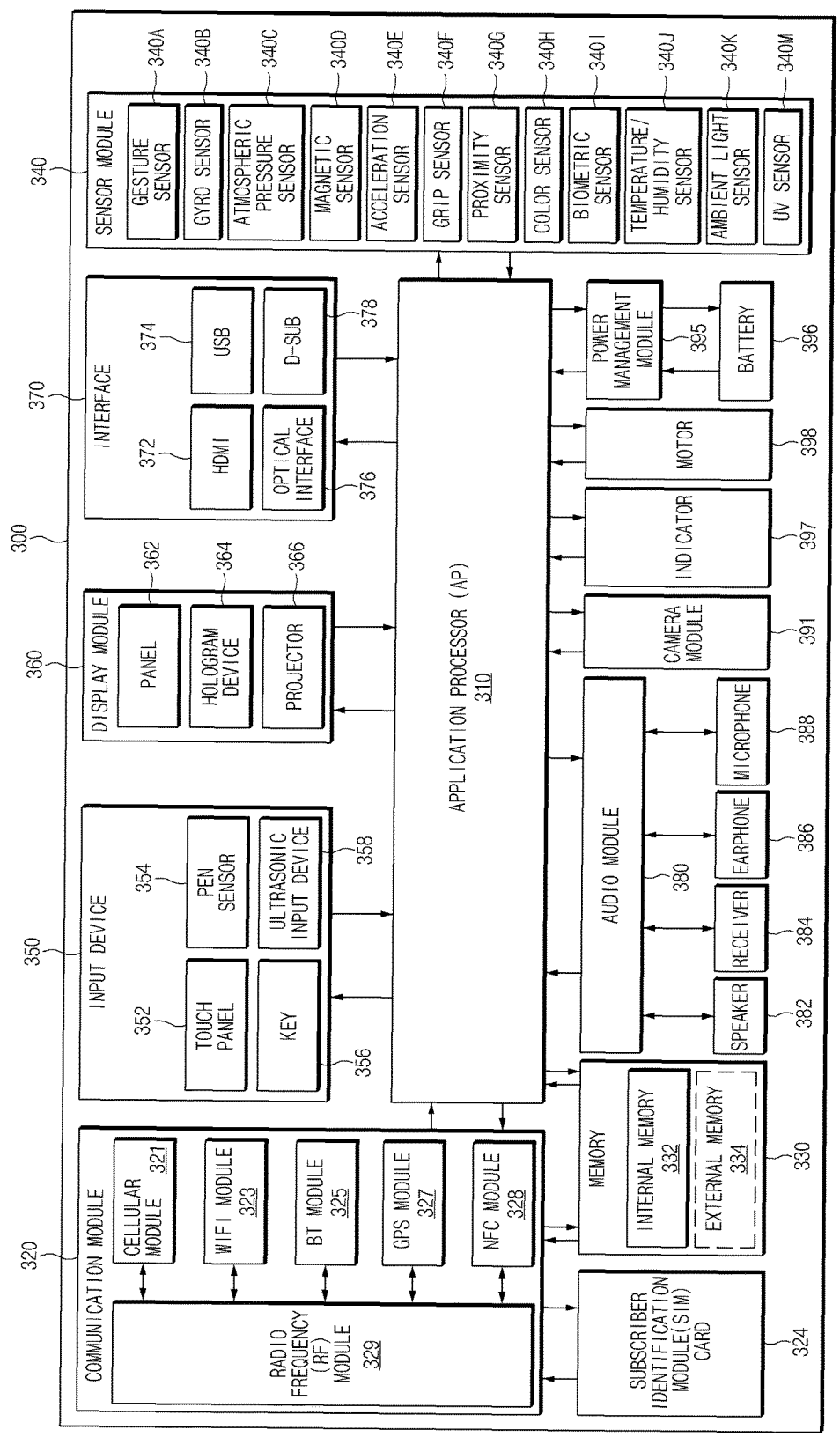
FIG. 19 is a block diagram illustrating a configuration of an electronic device, according to an embodiment of the present disclosure.

FIG. 19 is a block diagram illustrating a configuration of an electronic device, according to an embodiment of the present disclosure.

Referring to FIG. 19, an electronic device 300 may include all or a part of an electronic device 201 illustrated in FIG. 18. The electronic device 300 may include one or more AP 310, a communication module 320, a SIM card 324, a memory 330, a sensor module 340, an input device 350, a display module 360, an interface 370, an audio module 380, a camera module 391, a power management module 395, a battery 396, an indicator 397, and a motor 398.

The AP 310 drives an operating system (OS) or an application to control a plurality of hardware or software components connected to the AP 310 and processes and computes a variety of data including multimedia data. The AP 310 may be implemented with a System on Chip (SoC), for example. The AP 310 may further include a Graphic Processing Unit (GPU) and/or an image signal processor.

The communication module 320 may include a part (e.g., a cellular module 321) of components illustrated in FIG. 19. The AP 310 loads instructions or data, received from at least one of other components (e.g., a nonvolatile memory), onto a volatile memory and stores various data at a nonvolatile memory.

The communication module 320 may be configured to be the same as or similar to a communication interface 270 illustrated in FIG. 18. The communication module 320 may include a cellular module 321, a Wi-Fi module 323, a Bluetooth (BT) module 325, a GPS module 327, a Near Field Communication (NFC) module 328, and a Radio Frequency (RF) module 329.

The cellular module 321 provides voice communication, video communication, a character service, an Internet service, etc. through a communication network. The cellular module 321 performs authentication of the electronic device 201 within a communication network using the SIM card 324. The cellular module 321 may perform at least a portion of functions that the AP 310 provides. The cellular module 321 may include a communication processor (CP).

Each of the Wi-Fi module 323, the BT module 325, the GPS module 327, and the NFC module 328 may include a processor for processing data exchanged through a corresponding module. At least a portion (e.g., two or more components) of the cellular module 321, the Wi-Fi module 323, the BT module 325, the GPS module 327, and the NFC module 328 may be included within one Integrated Circuit (IC) or an IC package.

The RF module 329 transmits and receives data, for example, a communication signal (e.g., an RF signal). The RF module 329 may include a transceiver, a Power Amplifier Module (PAM), a frequency filter, Low Noise Amplifier (LNA), an antenna, or the like. At least one of the cellular module 321, the Wi-Fi module 323, the BT module 325, the GPS module 327, or the NFC module 328 may transmit and receive an RF signal through a separate RF module.

The SIM card 324 is a card and/or embedded SIM that includes unique identify information (e.g., Integrated Circuit Card Identifier (ICCID)) or subscriber information (e.g., Integrated Circuit Card Identifier (IMSI)).

The memory 330 (e.g., a memory 230) may include an embedded memory 332 or an external memory 334.

The embedded memory 332 may include at least one of a volatile memory (e.g., a Dynamic Random Access Memory (DRAM), a static RAM (SRAM), or a Synchronous DRAM (SDRAM)), a nonvolatile memory (e.g., a one-time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory), a hard drive, or a Solid State Drive (SSD).

The external memory 334 may include a flash drive, for example, Compact Flash (CF), Secure Digital (SD), Micro-Secure Digital (Micro-SD), Mini-Secure Digital (Mini-SD), extreme Digital (xD) or a memory stick. The external memory 334 may be functionally and/or physically connected to the electronic device 300 through various interfaces.

The sensor module 340 measures a physical quantity or detects an operation state of the electronic device 300. The sensor module 340 converts the measured or detected information to an electric signal. The sensor module 340 may include at least one of a gesture sensor 340A, a gyro sensor 340B, a pressure sensor 340C, a magnetic sensor 340D, an acceleration sensor 340E, a grip sensor 340F, a proximity sensor 340G, a color sensor 340H (e.g., Red, Green, Blue (RGB) sensor), a biometric sensor 340I, a temperature/humidity sensor 340J, an ambient light (illuminance) sensor 340K, or an UV sensor 340M. The sensor module 340 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 340 may further include a control circuit for controlling at least one or more sensors included therein.

The electronic device 300 may further include a processor which is a part of the AP 310 or independent of the AP 310 and is configured to control the sensor module 340. The processor may control the sensor module 340 when the AP 310 remains at a sleep state.

The input device 350 includes a touch panel 352, a (digital) pen sensor 354, a key 356, or an ultrasonic input unit 358.

The touch panel 352 may use at least one of capacitive, resistive, infrared and ultrasonic detecting methods. Also, the touch panel 352 may further include a control circuit. The touch panel 352 may further include a tactile layer. In this case, the touch panel 352 may provide a tactile reaction to a user.

The (digital) pen sensor 354 may be a part of a touch panel or may include a separate sheet for recognition.

The key 356 may include, for example, a physical button, an optical key, a keypad, and the like.

The ultrasonic input device 358, which is an input device for generating an ultrasonic signal, enables the electronic device 300 to sense a sound wave through a microphone 388 so as to identify data.

The display 360 (e.g., a display 260) may include a panel 362, a hologram device 364, or a projector 366.

The panel 362 may be configured to be the same as or similar to a display 260 illustrated in FIG. 18. The panel 362 may be, for example, flexible, transparent or wearable. The panel 362 and the touch panel 352 may be integrated into a single module.

The hologram device 364 displays a stereoscopic image in the air using interference of light.

The projector 366 projects light onto a screen so as to display an image. The screen may be arranged in the inside or the outside of the electronic device 300.

The display 360 may further include a control circuit for controlling the panel 362, the hologram device 364, or the projector 366.

The interface 370 may include a High-Definition Multimedia Interface (HDMI) 372, a USB 374, an optical interface 376, or a D-subminiature (D-sub) 378. The interface 370 may be included, for example, in a communication interface 270 illustrated in FIG. 18. The interface 370 may include, for example, a Mobile High Definition Link (MHL) interface, a SD card/Multi-Media Card (MMC) interface, or an Infrared Data Association (IrDA) standard interface.

The audio module 380 converts a sound and an electric signal in dual directions. At least a portion of the audio module 380 may be included, for example, in an input/output interface 250 illustrated in FIG. 18. The audio module 380 processes sound information that is input or output through a speaker 382, a receiver 384, an earphone 386, or a microphone 388.

The camera module 391 for shooting a still image or a video may include at least one image sensor (e.g., a front sensor or a rear sensor), a lens (not illustrated), an Image Signal Processor (ISP), or a flash (e.g., an LED or a xenon lamp).

The power management module 395 manages power of the electronic device 300. A Power Management Integrated Circuit (PMIC), a charger IC, or a battery gauge may be included in the power management module 395. The PMIC may have a wired charging method and/or a wireless charging method.

The wireless charging method may include, for example, a magnetic resonance method, a magnetic induction method or an electromagnetic method, and may further include a coil loop, a resonant circuit, a rectifier, etc.

The battery gauge measures, for example, a remaining capacity of the battery 396 and a voltage, current or temperature thereof while the battery is charged. The battery 396 may include, for example, a rechargeable battery or a solar battery.

The indicator 397 displays a specific state of the electronic device 300 or a part thereof (e.g., the AP 310), such as a booting state, a message state, a charging state, etc.

The motor 398 converts an electrical signal into a mechanical vibration and may generate vibration or a haptic effect.

A processing device (e.g., a GPU) for supporting a mobile TV may be included in the electronic device 300. The processing device for supporting a mobile TV may process media data according to the standards of Digital Multimedia Broadcasting (DMB), Digital Video Broadcasting (DVB) or media flow.

Each of the above-mentioned elements of the electronic device according to various embodiments of the present disclosure may be configured with one or more components, and the names of the elements may be changed according to the type of the electronic device.

The electronic device may include at least one of the above-mentioned elements, and some elements may be omitted or other additional elements may be added. Furthermore, some of the elements of the electronic device may be combined with each other so as to form one entity, so that the functions of the elements may be performed in the same manner as before the combination.

Figure 20:
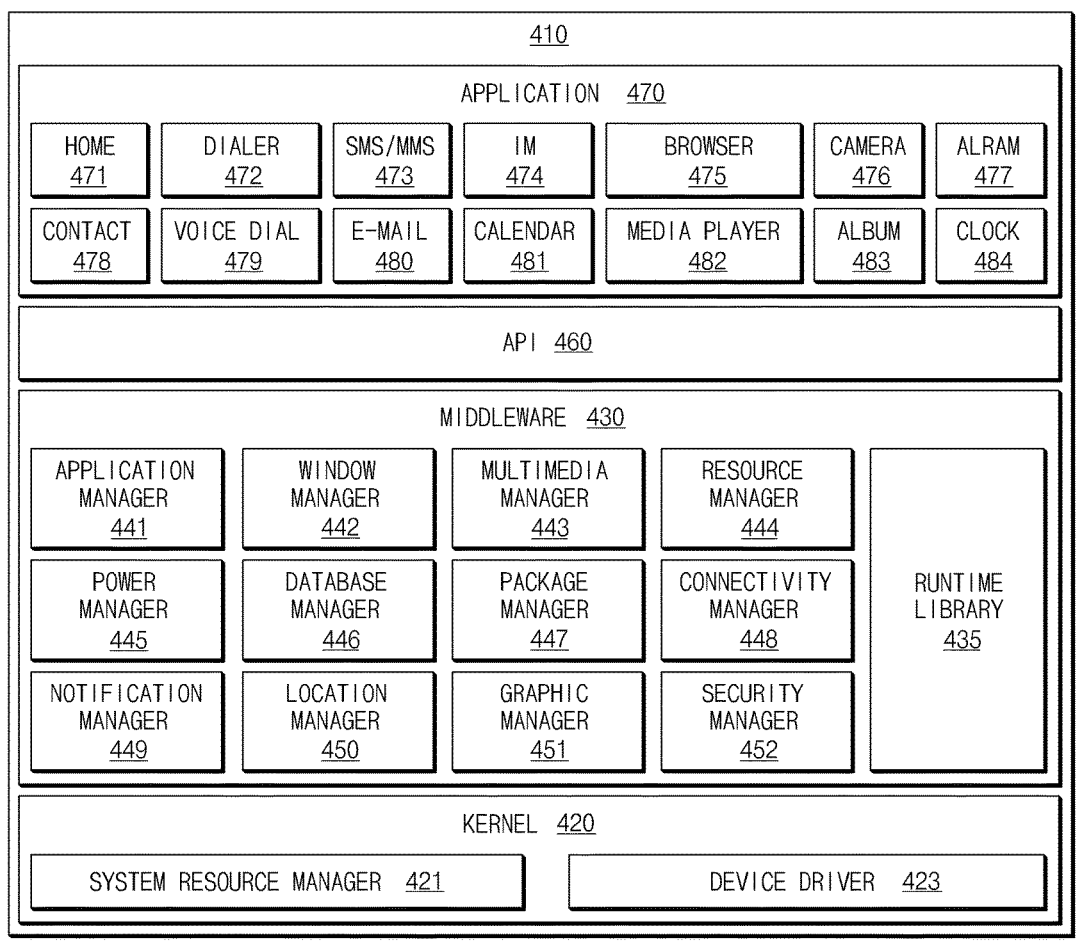
FIG. 20 illustrates a block diagram of a program module, according to an embodiment of the present disclosure.

FIG. 20 illustrates a block diagram of a program module, according to an embodiment of the present disclosure.

Referring to FIG. 20, a program module 410 (e.g., a program 240) includes an Operating System (OS) to control resources associated with an electronic device 201, and/or diverse applications driven on the OS. The OS may be, for example, Android™, iOS™, Windows™, Symbian™, Tizen™, or Bada™.

The program module 410 includes a kernel 420, a middleware 430, an Application Programming Interface (API) 460, and/or an application 470. At least a part of the program module 410 may be preloaded on electronic device 201 or may be downloadable from the server 206.

The kernel 420 includes a system resource manager 421 or a device driver 423.

The system resource manager 421 performs control, allocation, or retrieval of system resources. The system resource manager 421 may include a process managing part, a memory managing part, or a file system managing part.

The device driver 423 may include, for example, a display driver, a camera driver, a Bluetooth driver, a common memory driver, an USB driver, a keypad driver, a Wi-Fi driver, an audio driver, or an inter-process communication (IPC) driver.

The middleware 430 provides a function which the application 470 needs in common, or may provide diverse functions to the application 470 through the API 460 to allow the application 470 to efficiently use limited system resources of the electronic device. The middleware 430 may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, and a security manager 452.

The runtime library 435 may include a library module which is used by a compiler to add a new function through a programming language while the application 470 is being executed. The runtime library 435 performs input/output management, memory management, or capacities about arithmetic functions.

The application manager 441 manages a life cycle of at least one application of the application 470.

The window manager 442 manages a GUI resource which is used in a screen.

The multimedia manager 443 identifies a format necessary for playing diverse media files, and performs encoding or decoding of media files by using a codec suitable for the format.

The resource manager 444 manages resources such as a storage space, memory, or source code of at least one application of the application 470.

The power manager 445 operates with a Basic Input/Output System (BIOS) to manage a battery or power, and may provide power information for an operation of the electronic device 201.

The database manager 446 generates, searches for, or modifies a database which is to be used in at least one application of the application 470.

The package manager 447 installs or updates an application which is distributed in the form of package file.

The connectivity manager 448 manages a wireless connection such as Wi-Fi or Bluetooth.

The notification manager 449 displays or notifies of an event such as arrival message, promise, or proximity notification in a mode that does not disturb a user.

The location manager 450 manages location information of an electronic device.

The graphic manager 451 manages a graphic effect that is provided to a user, or manages a user interface relevant thereto.

The security manager 452 provides a general security function necessary for system security or user authentication. In the case where the electronic device 201 includes a telephony function, the middleware 430 may further includes a telephony manager for managing a voice or video call function of the electronic device.

The middleware 430 includes a middleware module that combines diverse functions of the above-described components. The middleware 430 may provide a module specialized to each OS kind to provide differentiated functions. Additionally, the middleware 430 may remove a part of the preexisting components, dynamically, or may add a new component thereto.

The API 460 is a set of programming functions and may be provided with a configuration which is variable depending on an OS. For example, in the case where an OS is Android or iOS, it may be permissible to provide one API set per platform. In the case where an OS is Tizen, it may be permissible to provide two or more API sets per platform.

The application 470 includes one or more applications capable of providing functions for a home 471, a dialer 472, an SMS/MMS 473, an Instant Message (IM) 474, a browser 475, a camera 476, an alarm 477, a contact 478, a voice dial 479, an e-mail 480, a calendar 481, a media player 482, an album 483, and a timepiece 484, or healthcare (e.g., for measuring an exercise quantity or blood sugar level) or environmental information (e.g., atmospheric pressure, humidity, or temperature).

The application 470 may include an application (hereinafter "information exchanging application") to support information exchange between the electronic device 201 and the external electronic devices 202 or 204.

The information exchanging application may include a notification relay application for transmitting specific information to the external electronic device, or a device management application for managing the external electronic devices 202 or 204.

The information exchanging application includes a function of transmitting notification information, which arise from other applications (e.g., applications for SMS/MMS, e-mail, health care, or environmental information), to an external electronic device 202 or 204.

Additionally, the information exchanging application receives notification information from an external electronic device 202 or 204 and provides the notification information to a user.

The device management application manages (e.g., installs, deletes, or updates), for example, at least one function (e.g., turn-on/turn-off of the external electronic device 202 or 204 itself (or a part of components) or adjustment of brightness (or resolution) of a display) of the external electronic device 202 or 204 which communicates with the electronic device 201, an application running in the external electronic device 202 or 204, or a service (e.g., a call service or a message service) provided from the external electronic device 202 or 204.

The application 470 may include an application (e.g., a health care application) which is assigned in accordance with an attribute (e.g., an attribute of a mobile medical device as a kind of electronic device) of the external electronic device 202 or 204)

The application 470 may include an application which is received from the server 206 or an external electronic device 202 or 204. The application 470 may include a preloaded application or a third party application which is downloadable from a server. The component titles of the program module 410 may be modifiable depending on the type of OS.

According to various embodiments of the present disclosure, at least a part of the program module 410 may be implemented in software, firmware, hardware, or a combination of at least two or more combinations thereof. At least a part of the program module 410 may be implemented (e.g., executed), for example, by a processor (e.g., an AP 310). At least a part of the program module 410 may include, for example, a module, a program, a set of instructions, or a process for performing one or more functions.

The term "module" used herein may represent, for example, a unit including one or more combinations of hardware, software and firmware. The term "module" may be interchangeably used with the terms "unit", "logic", "logical block", "component" and "circuit".

The "module" may be a minimum unit of an integrated component or may be a part thereof. The "module" may be a minimum unit for performing one or more functions or a part thereof.

The "module" may be implemented mechanically or electronically. For example, the "module" may include at least one of an Application-Specific IC (ASIC) chip, a Field Programmable Gate Array (FPGA), and a programmable-logic device for performing some operations, which are known or will be developed.

At least a portion of an apparatus (e.g., modules or functions thereof) or a method (e.g., operations) according to various embodiments of the present disclosure, for example, may be implemented by instructions stored in a computer-readable storage media in the form of a programmable module. The instruction, when executed by one or more processors (e.g., the processor 220), may cause the apparatus to perform a function corresponding to the instruction. The computer-readable storage media, for example, may be the memory 230.

A computer-readable recording medium may include a hard disk, a magnetic media such as a floppy disk and a magnetic tape, an optical media such as Compact Disc Read Only Memory (CD-ROM) and a Digital Versatile Disc (DVD), a magneto-optical media such as a floptical disk, and the following hardware devices specifically configured to store and perform a program instruction (e.g., a programming module): Read Only Memory (ROM), Random Access Memory (RAM), and a flash memory. Also, a program instruction may include not only a mechanical code, such as code generated by a compiler, but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device case comprising:
   a first case having a first groove; and
   a second case including a first body, a connection portion formed at the first body so as to be coupled with the first case when the first body is inserted into the first groove, and a card holding portion where a partition is formed to attach a card to the first body,
   wherein the card holding portion comprises a first hook and a second hook protruding inward from the partition to prevent the card from being separated when the card is inserted in the partition,
   wherein the first hook and the second hook are spaced apart from each other, and
   wherein the connection portion comprises one or more rails of a groove shape and the first case comprises one or more hooks configured to be inserted into the one or more rails to guide a movement of the second case.

2. The electronic device case of claim 1, wherein the partition is formed of a material softer than the material of the first body.

3. The electronic device case of claim 2, wherein the partition is formed at the first body, and a section of the partition has a shape corresponding to the shape of the card attached to the first body.

4. The electronic device case of claim 3, wherein a plurality of sidewalls of the card holding portion forms the partition in a quadrangular shape, the first hook protrudes inward from a first sidewall of the partition, and the second hook protrudes inward from a second sidewall of the partition, the second sidewall being opposite the first sidewall.

5. The electronic device case of claim 4, wherein the card holding portion further comprises:
   a second body having a first side contacting with the first body and a second side upon which the card is placed on, and
   wherein the partition protrudes from the second body.

6. The electronic device case of claim 5, wherein a height of a portion of the partition is lower than that of the rest of the partition such that a first insertion groove is formed.

7. The electronic device case of claim 6,
   wherein all or a portion of one surface of the partition is lower than remaining surfaces of the partition such that the first insertion groove is formed.

8. The electronic device case of claim 7, wherein the card holding portion further comprises:
   a second groove recessed toward an inside of the second body such that a space is formed between the card and the second body upon inserting the card.

9. The electronic device case of claim 8, wherein the first body comprises an incline sloping toward one side from a top end of the first insertion groove.

10. The electronic device case of claim 9, wherein the card holding portion is formed of a material providing an elastic force.

11. The electronic device case of claim 10, wherein the first case comprises:
    a protrusion rear contacting with the partition when the card holding portion is inserted into the first groove formed at the first case.

12. The electronic device case of claim 3, wherein the connection portion comprises:
    a third hook protruding from a first side of the first body;
    a fourth hook spaced apart from the third hook on the first side of the first body and protruding in a direction in which the first hook protrudes; and
    a fifth hook protruding from a second side of the first body in a direction opposite the direction in which the first hook protrudes, and
    wherein the first case further comprises a second groove, a third groove, and a fourth groove, the second groove, the third groove, and the fourth groove being respectively inserted into the third hook, the fourth hook, and the fifth hook of the second case when the second case is coupled with the first case.

13. The electronic device case of claim 12, wherein the first body further comprises:
    a third insertion groove recessed inward between the third hook and the fourth hook.

14. The electronic device case of claim 13, wherein the first case further comprises:
    a waterproof portion provided on the protrusion rear.

15. The electronic device case of claim 14, wherein the waterproof portion comprises:
    a first waterproof member attached on a top surface of the protrusion rear; and
    a second waterproof member making an angle of inclination relative to the first waterproof member, protruding from a top surface of the first waterproof member, and providing an elastic force to press the first body when the second case is coupled with the first case.

16. The electronic device case of claim 11, wherein the one or more rails are formed at a first and second sidewall of the first body in a length direction, and
    wherein the connection portion further comprises a fifth groove formed at an inside surface of the first body, and wherein the first case further comprises
a seventh hook protruding from one side of the first case so as to be inserted into the fifth groove when the second case is inserted into the first case.

17. The electronic device case of claim 16, wherein the second case comprises:
a waterproof portion disposed along a circumference surface of a partition.

18. The electronic device case of claim 13, wherein the connection portion is curved when connected with the first body.

19. An electronic device comprising:
a card for storing information;
a second case including a card holding portion where a partition, formed of a material softer than a material of a body, is formed to attach the card; and
a first case where a groove is formed such that a circuit board contacting with the card is exposed externally at coupling with the second case through a connection portion of the second case,
wherein the card holding portion comprises a first hook and a second hook protruding inward from the partition to prevent the card from being separated when the card is inserted in the partition,
wherein the first hook and the second hook are spaced apart from each other, and
wherein the connection portion comprises one or more rails of a groove shape and the first case comprises one or more hooks configured to be inserted into the one or more rails to guide a movement of the second case.

* * * * *